United States Patent [19]
Koontz

[11] 3,736,066
[45] May 29, 1973

[54] VIBRATORY EARTH COMPACTING APPARATUS

[75] Inventor: Victor N. Koontz, Los Angeles, Calif.

[73] Assignee: Pettibone Corporation, Chicago, Ill.

[22] Filed: Mar. 15, 1971

[21] Appl. No.: 124,023

[52] U.S. Cl. .............................................. 404/117
[51] Int. Cl. ............................................ E01c 19/28
[58] Field of Search ................ 94/48, 50 R, 50 V; 74/61, 87

[56] References Cited

UNITED STATES PATENTS

| | | |
|---|---|---|
| 2,743,585 | 5/1956 | Berthet .............................. 94/48 X |
| 3,262,329 | 7/1966 | Herrmann .......................... 94/48 X |
| 3,415,174 | 12/1968 | Kaltenegger ....................... 94/50 V |
| 3,426,660 | 2/1969 | Scott ................................... 94/50 V |
| 3,595,145 | 7/1971 | Mozdzanowski .................. 94/50 V |
| 3,176,597 | 4/1965 | Seaman .............................. 94/50 V |
| 3,385,119 | 5/1968 | Berger ............................... 94/48 X |
| 3,287,983 | 11/1966 | Austin ................................. 74/61 |
| 3,505,885 | 4/1970 | Waschulewski .................... 94/48 X |
| 3,192,839 | 7/1965 | Vivier ................................. 94/50 V |
| 3,618,485 | 11/1971 | Hermann ............................ 94/48 |
| 3,283,679 | 11/1966 | Rafferty ............................ 94/50 R |
| 3,543,656 | 12/1970 | Roettger ........................... 94/50 V |

Primary Examiner—Nile C. Byers, Jr.
Attorney—Harris, Kern, Wallen & Tinsley

[57] ABSTRACT

A vibratory earth compacting apparatus comprising a vehicle having a main frame and a roller frame mounted on the main frame for vertical movement relative thereto, the roller frame carrying an earth compacting roller rotatable about a transverse axis, and vibrated by two vibration generators which extend longitudinally of the vehicle and are mounted on the roller frame in transversely spaced relation. Each of the vibration generators includes eccentric driving and driven shafts extending longitudinally of the vehicle and geared together. The gearing between the driving and driven shafts of each generator includes meshed driving and driven gears and the driven gear is axially movable out of mesh with the driving gear so that the driven gear, and its eccentric shaft, may be displaced angularly relative to the driving gear, and its eccentric shaft, thereby adjusting the amplitude of vibration independently of the frequency. The driven gears of the two generators, and their eccentric shafts, are angularly adjusted equally and in opposite directions so as to cancel out horizontal vibration components for a net horizontal vibration output of zero.

4 Claims, 7 Drawing Figures

PATENTED MAY 29 1973 3,736,066

INVENTOR.
VICTOR NEIL KOONTZ
BY HIS ATTORNEYS.

HARRIS, KIECH, RUSSELL & KERN

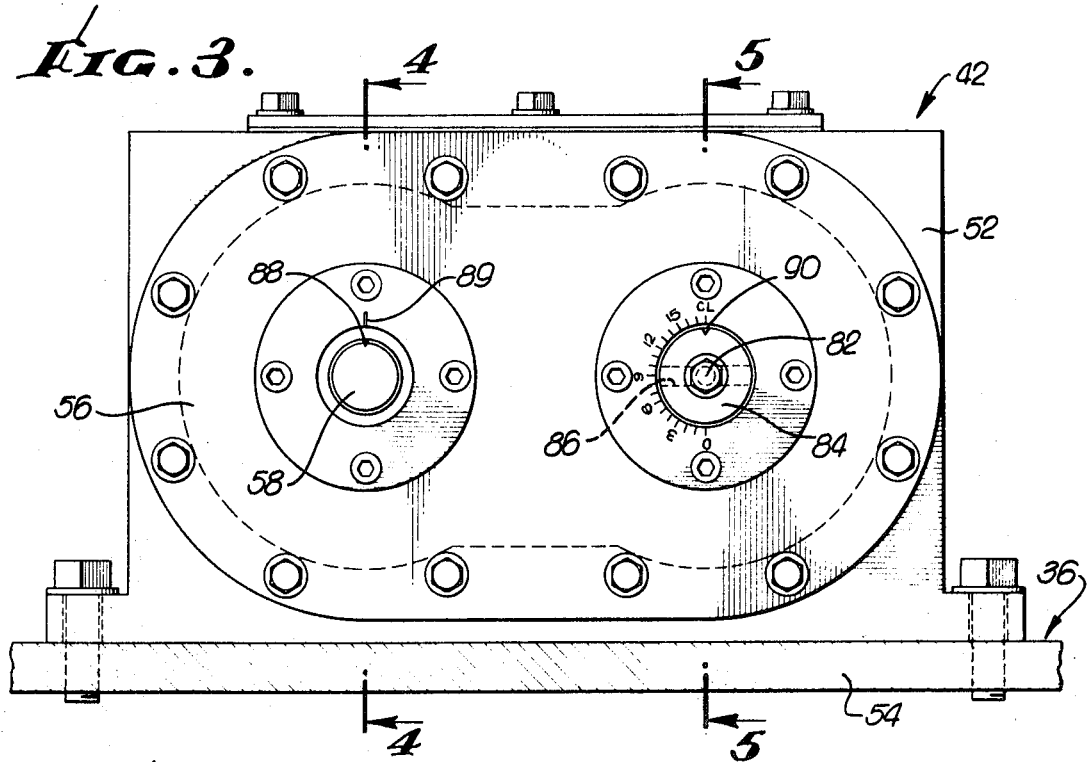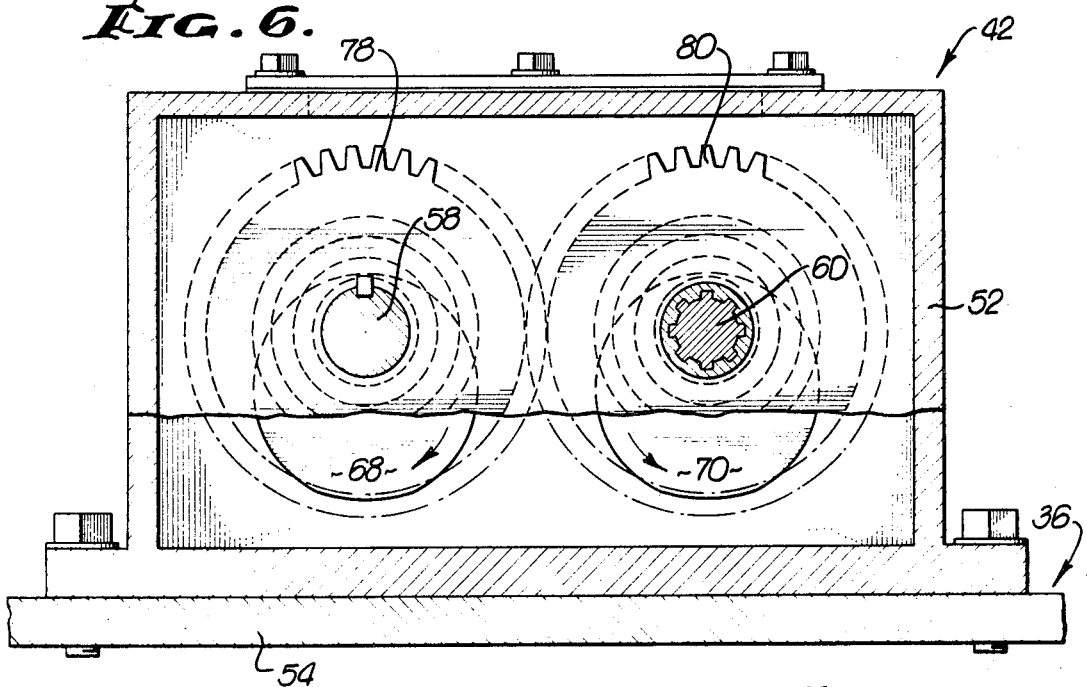

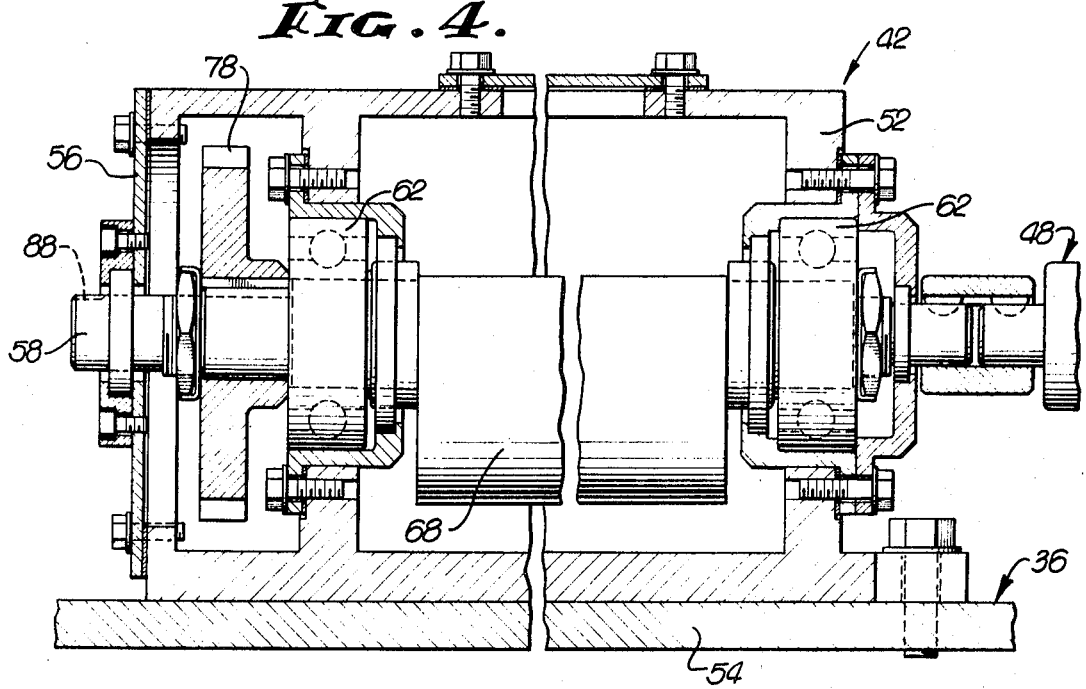
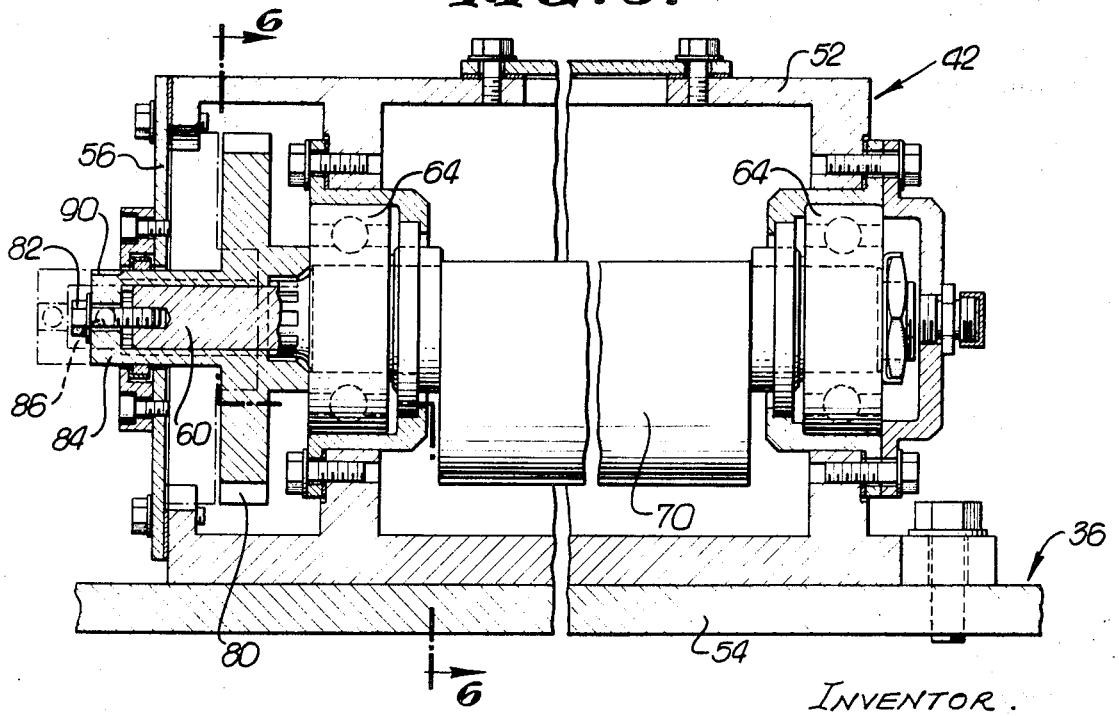

VIBRATORY EARTH COMPACTING APPARATUS

BACKGROUND OF INVENTION

The present invention relates in general to earth or soil compacting apparatuses and, more particularly, to an earth compacting apparatus of the vibratory type.

As additional background, the invention contemplates a vibratory earth compacting apparatus of the type which includes: a vehicle having a main frame and a roller frame mounted on the main frame for vertical movement relative thereto, an earth compacting roller means being mounted on the roller frame for rotation about a transverse axis, i.e., an axis extending laterally of the direction of travel of the vehicle; and vibration generating means mounted on the roller frame for imparting vertical vibratory movement to the roller frame, and thus to the roller means, thereby enhancing the earth compacting effectiveness of the roller means.

SUMMARY OF OBJECTS OF INVENTION

A primary object of the invention is to provide a vibratory earth compacting apparatus of the foregoing general type wherein the vibration generating means includes two vibration generators which are mounted on the roller frame in transversely spaced relation and which include eccentric means rotatable about longitudinal axes and so phased as to cancel out horizontal vibration components, whereby only vertical components of vibration are transmitted to the roller means. The use of eccentric means rotatable about longitudinal axes also precludes any longitudinal de-compaction force waves, which is an important feature.

More particularly, an important object of the invention is to provide vibration generators respectively comprising eccentric-carrying driving and driven shafts which are rotatable about longitudinal axes in a common horizontal plane, the driving and driven shafts of each generator being geared together and means being provided for rotating the driving shafts of the two generators.

Another important object is to provide vibration generators of the foregoing character wherein the eccentric driving and driven shafts of one generator are phased oppositely to the eccentric driving and driven shafts of the other in such a manner as to cancel out horizontal vibration components, whereby only vertical components of vibration are transmitted to the roller means.

Still another and important object of the invention is to provide a vibration generator wherein the gearing or gear means between the driving and driven eccentric shafts incorporate means for varying the relative angular positions of the eccentric masses of the eccentric driving and driven shafts in a step-by-step manner to provide a plurality of different vibration amplitudes at any given frequency. More specifically, an object in this connection is to provide means incorporated in the gearing between the driving and driven shafts for varying the angular position of the eccentric mass of the driven shaft relative to that of the eccentric mass of the driving shaft. An important object in this connection is to provide an external adjustment means requiring no adjustments internally of the vibration generator.

Still more particularly, another important object of the invention is to provide a vibration generator wherein the gear means between the driving and driven eccentric shafts includes: a driving gear on the driving eccentric shaft; a driven gear on the driven eccentric shaft and normally meshed with the driving gear; means mounting the driven gear on the driven eccentric shaft for axial movement of the driven gear relative to the driven eccentric shaft into and out of mesh with the driving gear; whereby the driven gear and its eccentric shaft may be displaced angularly relative to the driving gear and its eccentric shaft, when the driven gear is out of mesh with the driving gear, so as to angularly displace the eccentric mass of the driven shaft relative to the eccentric mass of the driving shaft.

Any angular adjustments of the positions of the eccentric mass of the driven shafts of the two vibration generators are made in equal increments and in opposite directions so as to cancel horizontal components of vibration, as hereinbefore discussed.

Another important advantage of the foregoing arrangement of eccentric driving and driven shafts is that coriolis components of acceleration act horizontally in the transverse direction, thereby eliminating any hindering effect on traction.

The foregoing objects, advantages, features and results of the present invention, together with various other objects, advantages, features and results thereof which will be evident to those skilled in the vibratory earth compacting art in the light of this disclosure, may be achieved with the exemplary embodiment of the invention illustrated in the accompanying drawings and described in detail hereinafter.

DESCRIPTION OF DRAWINGS

In the drawings:

FIG. 3 is an enlarged sectional view taken as indicated by the arrowed line 3—3 of FIG. 1, and showing the rearward end of one of two vibration generators with which the machine is equipped, the other vibration generator being in effect a mirror image of the first;

FIGS. 4 and 5 are fragmentary longitudinal sectional views respectively taken along the arrowed lines 4—4 and 5—5 of FIG. 3; and FIG. 6 is a transverse sectional view taken as indicated by the arrowed line 6—6 of FIG. 5 of the drawings.

DESCRIPTION OF EXEMPLARY EMBODIMENT OF INVENTION

Figure 1:
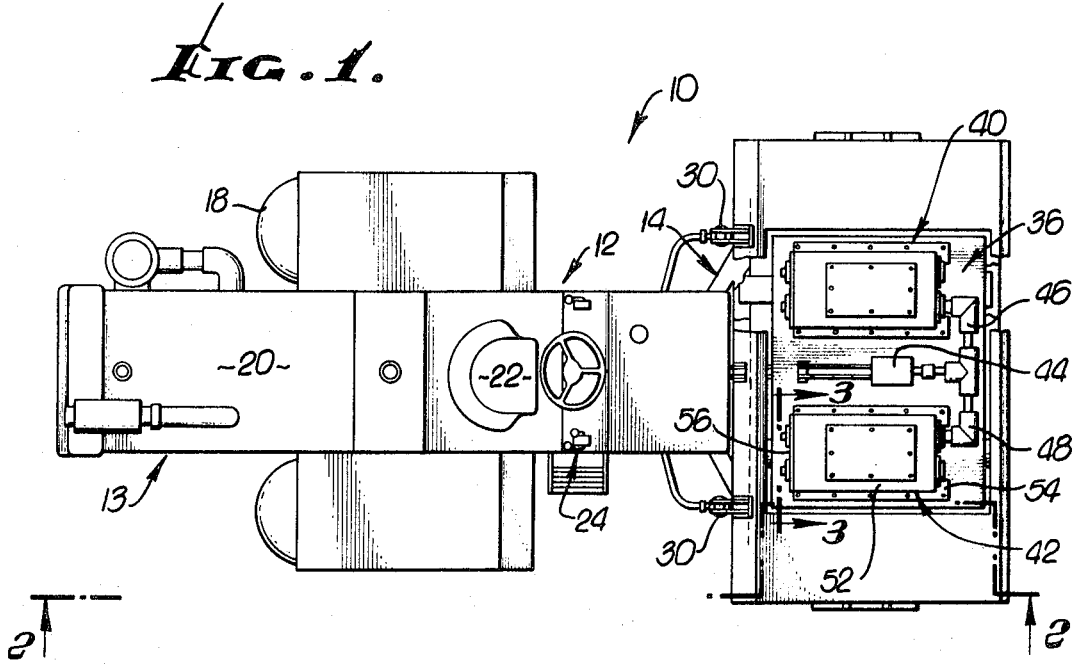
FIG. 1 is a plan view of a vibratory earth compacting apparatus or machine of the invention.
Figure 2:
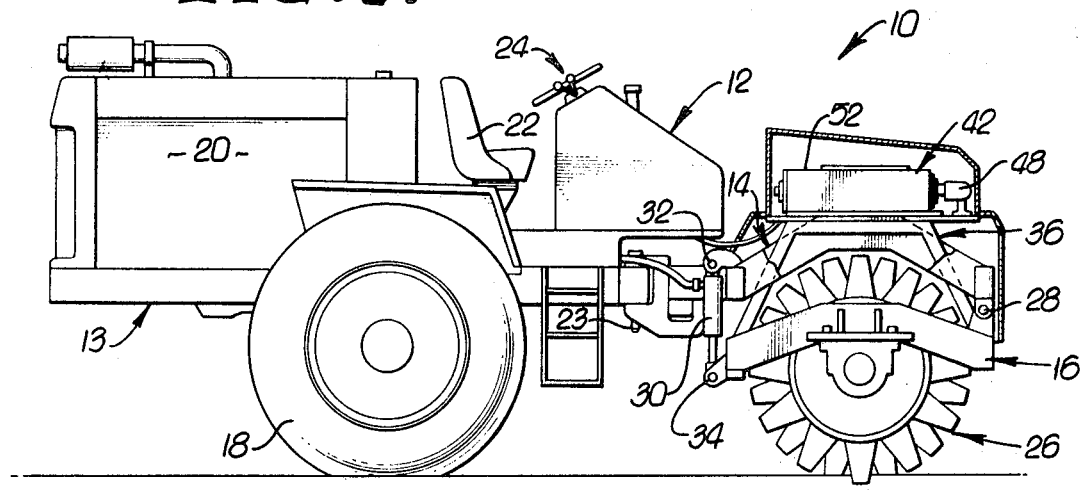
FIG. 2 is a side elevational view, partially in vertical section, taken as indicated by the arrowed line 2—2 of FIG. 1.
Figure 2A:
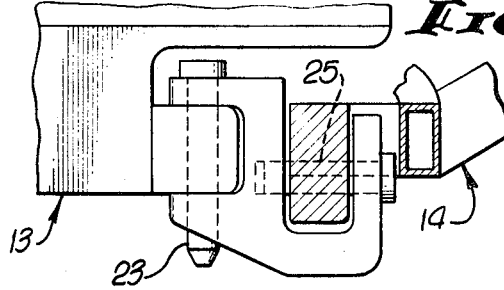
FIG. 2a is an enlarged, fragmentary sectional view showing an interconnection between rear and front main frames of the machine.

Referring initially to FIGS. 1, 2 and 2a of the drawings, the vibratory earth compacting apparatus or machine illustrated therein is designated generally by the numeral 10 and comprises a vehicle 12 having a rear main frame 13 and a front main frame 14 carrying an auxiliary roller frame 16.

The rear main frame 13 is shown as supported by two traction wheels 18 rotatable about a transverse axis. The frame 13 carries an internal combustion engine 20 for driving the traction wheels 18 and for providing power to other components of the machine 10, including the vibration generators to be described hereinafter. The frame 13 is also equipped with an operator's seat 22 and the usual controls 24. The rear and front main frames 13 and 14, as best shown in FIG. 2a, are interconnected by vertical and longitudinal trunnions 23 and 25. The machine 10 may be steered by pivoting the front main frame 14 relative to the rear main frame 13 about the vertical axis of the trunnion 23. The trunnion 25 permits lateral oscillation of the front main frame 14 relative to the rear main frame about a central longitudinal axis to compensate for irregular terrain.

Mounted on the roller frame 16 for rotation about a transverse axis is an earth compacting roller or roller means 26, which is shown as being of the sheep's foot type, but which could also be of the smooth type. The roller frame 16 is pivotally connected at its forward end, at 28, to the forward end of the front main frame 14 for pivotal movement about a transverse axis. Transversely spaced rubber hydraulic, and/or pneumatic cushioning devices 30 interconnect the front main frame 14 and the rearward end of the roller frame 16, being pivotally connected to the front main frame 14 at their upper ends, at 32, and being pivotally connected to the roller frame 16 at their lower ends, at 34. With this construction, the roller frame 16 is free to move vertically relative to the front main frame 14 so that vibratory energy applied to the roller frame 16 in a manner to be described is transmitted to the roller means 26 to cause same to compact the soil or earth therebeneath. At the same time, transmission of vibration to the front main frame 14 and the rear main frame 13 is minimized.

The roller frame 16 includes a superstructure 36, above the roller means 26, on which are mounted in side-by-side, transversely spaced relation, two vibration generators 40 and 42 of the invention. The vibration generators 40 and 42 are driven by a hydrostatic motor 44 connected thereto by suitable drive trains 46 and 48, respectively.

The two vibration generators 40 and 42 are identical, except that they are mirror images of each other. Consequently only the vibration generator 42 will be considered in detail herein, with the understanding that the same description applies to the vibration generator 40, except in an opposite sense.

Turning now to FIGS. 3 to 6 of the drawings, the vibration generator 42 comprises a longitudinally extending housing 52 bolted, or otherwise secured, to a heavy rectangular, horizontal plate 54 forming part of the roller frame superstructure 36. The housing 52 is provided at its rearward end with a removable cover plate 56 for access to the interior of the housing.

Rotatable in the housing 52 about transversely spaced, longitudinal axes in a common horizontal plane are an inboard driving shaft 58 and an outboard driven shaft 60 respectively carried by bearings 62, FIG. 4, and 64, FIG. 5. The inboard driving shaft 58 is driven at its forward end by the drive train 48 from the motor 44, as indicated in FIG. 4 of the drawings.

Formed integrally with or otherwise fixedly mounted on the driving and driven shafts 58 and 60 are eccentrics or eccentric masses 68 and 70. These eccentrics are shown in phase in the drawings, but the phase relationship is adjustable, as will be discussed hereinafter.

The rearward ends of the eccentric driving and driven shafts 58 and 60 respectively carry driving and driven gears 78 and 80 which are normally in mesh. Thus, as indicated by the rotational arrows in FIG. 6, when the driving shaft 58 is driven by the drive train 48, the eccentrics or eccentric masses 68 and 70 are driven in opposite directions.

The driving gear 78 is keyed to the eccentric driving shaft 58 so that the angular relationship between the driving gear 78 and its eccentric mass 68 is fixed. However, the driven gear 80 is angularly adjustable relative to the driving gear 78 so as to permit adjusting the angular position of the eccentric 70 relative to the eccentric 68 to vary the vertical component of vibration or force produced by the two eccentrics. Considering how this is accomplished, and referring particularly to FIG. 5 of the drawings, the driven gear 80 is internally splined with a sliding fit to the driven shaft 60 so that it can be displaced axially from a position wherein it is in mesh with the driving gear 78 to a position wherein it is out of mesh. In FIG. 5, the driven gear 80 is shown in in its meshed position in solid lines, and is shown in its out-of-mesh position in broken lines.

The driven gear 80 is normally held in its meshed position by a screw 82 threaded into the rearward end of the driven shaft 60, this screw extending through the rearward end of a cup-shaped hub 84 of the driven gear. As will be apparent, upon removal of the screw 82, the driven gear 80 may be shifted axially rearwardly out of engagement with the driving gear 78 to permit angular displacement of the driven gear 80, its shaft 60 and corresponding eccentric 70, to adjust the phase relationship of the eccentric 70 relative to the eccentric 68. To facilitate axial displacement of the driven gear 80 between its two positions, the hub 84 is provided with a transverse hole 86 to receive a suitable handle, not shown.

To adjust the vertical amplitude of vibration or force of the generator 42, the driving shaft 58 is first rotated into a reference position, wherein an indicium 88, FIG. 3, on the rearward end of the driving shaft 58 is in register with a fixed indicium 89. Similarly, the rearward end of the driven shaft 60 is provided with an indicium 90 which is registerable with any of a plurality of fixed indicia O to CL arranged in a semicircular array. The latter indicia represent phase angles of the eccentric 70 relative to eccentric 68 ranging from 0° to 180°. For example, the numbers of teeth on the driving and driven gears 78 and 80 may be such that the phase angle of the eccentric 70 relative to the eccentric 68 can be adjusted by ten-degree increments by shifting the driven gear 80 relative to the driving gear 78 by one-tooth increments. However, other angular adjustment increments may be used.

With the particular phasing of the eccentrics 68 and 70 illustrated in the drawings, the eccentrics are "in phase", i.e., they both achieve their lowermost and uppermost positions at the same times, thereby providing the maximum possible vertical amplitude of vibration. This is indicated in FIG. 3 by the positioning of the indicium 90 in register with the indicium CL.

The phasing of the adjustable eccentric 70 relative to the eccentric 68 can be adjusted, by means of the disengageable driven gear 80, to decrease the vertical component of vibration. To do this, the indicium 88 on the driven shaft 58 is first positioned opposite the indicium 89. Then, the screw 82 is removed, and the driven gear 80 is displaced axially rearwardly out of engagement with the driving gear 78. The driven gear 80, its shaft 60, and the corresponding eccentric 70, are all then displaced angularly until the desired out-of-phase relationship of the eccentric 70 relative to the eccentric 68 is achieved, as indicated by the indicia O to CL. Then, the driven gear 80 is re-engaged with the driving gear 78, and locked in place by means of the screw 82.

Whenever the angular position of the driven gear 80 relative to the driving gear 78 is adjusted, an opposite adjustment of the driven gear relative to the driving gear of the other vibration generator 40 must be made. This is simplified by providing the vibration generator 40 with a O to CL scale identical to that of the vibration generator 42, but reversed. In other words, the two scales in question are mirror images of each other.

By simultaneously adjusting the two vibration generators 40 and 42 in opposite directions in the foregoing manner, the vertical component of vibration can be varied between zero at O setting and a maximum at CL setting, while the horizontal components cancel so that the net horizontal vibration output is zero at all times, which is an important feature.

It is important to note that the generators 40 and 42 can be adjusted completely externally, with no necessity for internal adjustments.

Although an exemplary embodiment of the invention has been disclosed herein for purposes of illustration, it will be understood that various changes, modifications and substitutions may be incorporated in such embodiment without departing from the spirit of the invention as set forth in the claims appearing in the next section of this specification.

I claim as my invention:

1. In a vibration generator, the combination of:
   a. a supporting structure;
   b. parallel driving and driven eccentric shafts rotatably mounted on said supporting structure;
   c. normally meshed driving and driven gears on said driving and driven shafts, respectively;
   d. means mounting said driven gear on said driven shaft for axial movement of said driven gear relative to said driven shaft into and out of mesh with said driving gear; and
   e. whereby said driven gear and shaft may be displaced angularly relative to said driving gear and shaft, when said driven gear is out of mesh with said driving gear, so as to angularly displace said driven shaft relative to said driving shaft.

2. In a vibratory earth compacting apparatus, the combination of:
   a. a vehicle having a main frame;
   b. a roller frame mounted on said main frame for vertical movement relative thereto;
   c. an earth compacting roller means mounted on said roller frame for rotation about a transverse axis;
   d. two vibration generators mounted on said roller frame in transversely spaced relation;
   e. each of said vibration generators including an eccentric driving shaft and an eccentric driven shaft extending longitudinally of said vehicle, the axes of said driving and driven shafts lying in a common horizontal plane;
   f. each of said vibration generators including gear means interconnecting said driving and driven shafts thereof, each of said gear means incorporating means for varying the relative angular positions of said driving and driven shafts of that particular generator, each of said gear means including a driving gear on said driving shaft, a driven gear on said driven shaft and normally meshed with said driving gear, means mounting said driven gear on said driven shaft for axial movement of said driven gear relative to said driven shaft into and out of mesh with said driving gear, and whereby said driven gear and shaft may be displaced angularly relative to said driving gear and shaft, when said driven gear is out of mesh with said driving gear, so as to angularly displace said driven shaft relative to said driving shaft; and
   g. means for driving said driving shafts of said vibration generators.

3. An apparatus according to claim 2 wherein said driving shafts are between said driven shafts.

4. In a vibratory earth compacting apparatus, the combination of:
   a. a vehicle having a main frame;
   b. a roller frame mounted on said main frame for vertical movement relative thereto;
   c. an earth compacting roller means mounted on said roller frame for rotation about a transverse axis;
   d. two vibration generators mounted on said roller frame in transversely spaced relation;
   e. each of said vibration generators including a rotatable eccentric driving shaft and a rotatable eccentric driven shaft extending longitudinally of said vehicle;
   f. the axes of rotation of all of said shafts lying in a common horizontal plane;
   g. drive means connected to said driving shafts for driving same;
   h. each of said vibration generators including gear means connecting said driven shaft of that generator to said driving shaft thereof; and
   i. said gear means of each of said vibration generators including a means for varying circumferentially the angular position of said driven shaft of that generator relative to said driving shaft thereof without disconnecting said driving shaft from said drive means.

* * * * *